United States Patent
Kottilingam et al.

(10) Patent No.: US 10,539,041 B2
(45) Date of Patent: Jan. 21, 2020

(54) COOLED ARTICLE AND METHOD OF FORMING A COOLED ARTICLE

(71) Applicant: GENERAL ELECTRIC COMPANY, Schenectady, NY (US)

(72) Inventors: Srikanth Chandrudu Kottilingam, Simpsonville, SC (US); Benjamin Paul Lacy, Greer, SC (US); Brian Gene Brzek, Clifton Park, NY (US); David Edward Schick, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1621 days.

(21) Appl. No.: 14/059,909

(22) Filed: Oct. 22, 2013

(65) Prior Publication Data

US 2015/0111060 A1   Apr. 23, 2015

(51) Int. Cl.
*B32B 15/01* (2006.01)
*B32B 3/26* (2006.01)
(Continued)

(52) U.S. Cl.
CPC .............. *F01D 25/12* (2013.01); *B22F 7/004* (2013.01); *B32B 3/26* (2013.01); *B32B 15/01* (2013.01);
(Continued)

(58) Field of Classification Search
CPC ...... F28F 13/003; F28F 13/185; F28F 13/187; F28F 7/02; F28F 2255/18;
(Continued)

(56) References Cited

U.S. PATENT DOCUMENTS 2,641,439 A * 6/1953 Williams ............... F01D 5/187
  205/180
3,402,914 A * 9/1968 Kump .................... F01D 5/183
  415/115
(Continued)

FOREIGN PATENT DOCUMENTS

CN        101173610 A      5/2008
WO    WO 2005118912 A1 * 12/2005 ........... B23K 35/302

OTHER PUBLICATIONS

Unofficial English Translation of Chinese Office Action issued in connection with corresponding CN Application No. 201410564834.5 dated Jan. 3, 2017.
(Continued)

*Primary Examiner* — Christopher R Zerphey
*Assistant Examiner* — For K Ling
(74) *Attorney, Agent, or Firm* — McNees Wallace & Nurick LLC

(57) ABSTRACT

A cooled article and a method of forming a cooled article are disclosed. The cooled article includes a component, a porous material incorporated into the component, and a cooling medium within the porous material. Another cooled article is formed by a process includes the steps of forming a porous material from a pre-sintered preform, providing a component, and incorporating the porous material into the component. The porous material is in fluid communication with a cooling medium. The method of forming a cooled article includes providing a metal felt material infused with braze filler material, pre-sintering the metal felt material to form a porous material, providing a component, and incorporating the porous material into the component.

18 Claims, 3 Drawing Sheets

(51) Int. Cl.
  *B22F 7/00* (2006.01)
  *F28F 13/00* (2006.01)
  *B22F 5/00* (2006.01)
  *F01D 25/12* (2006.01)

(52) U.S. Cl.
  CPC ............ *F28F 13/003* (2013.01); *B22F 5/009* (2013.01); *B32B 2250/02* (2013.01); *B32B 2260/021* (2013.01); *B32B 2260/04* (2013.01); *B32B 2311/22* (2013.01); *B32B 2603/00* (2013.01); *Y10T 428/12444* (2015.01)

(58) Field of Classification Search
  CPC .............. F28D 2021/0064; C22C 1/08; F01D 5/181–184; F01D 5/18
  USPC ...... 165/168; 428/550, 613; 416/97 A, 96 R, 416/229 R; 415/115
  See application file for complete search history.

(56) References Cited

U.S. PATENT DOCUMENTS

| | | | | |
|---|---|---|---|---|
| 3,567,333 | A * | 3/1971 | De Feo | F01D 5/183 416/231 R |
| 3,656,863 | A * | 4/1972 | De Feo | F01D 5/183 416/193 R |
| 3,695,778 | A | 10/1972 | John | |
| 3,844,011 | A * | 10/1974 | Davies | B22F 3/1109 419/9 |
| 4,273,824 | A | 6/1981 | McComas et al. | |
| 4,629,397 | A * | 12/1986 | Schweitzer | F01D 5/284 165/907 |
| 4,729,871 | A | 3/1988 | Morimoto | |
| 6,090,232 | A | 7/2000 | Seeliger et al. | |
| 6,096,111 | A * | 8/2000 | Polese | B01D 39/2075 257/E23.112 |
| 6,241,469 | B1 | 6/2001 | Beeck et al. | |
| 6,264,766 | B1 | 7/2001 | Ritter et al. | |
| 6,428,280 | B1 * | 8/2002 | Austin | C04B 35/10 415/200 |
| 6,511,762 | B1 * | 1/2003 | Lee | B32B 18/00 416/241 B |
| 7,328,831 | B1 * | 2/2008 | Topolski | B22F 3/1137 228/227 |
| 7,500,828 | B2 * | 3/2009 | Landis | F01D 5/147 416/1 |
| 2005/0167086 | A1 * | 8/2005 | Rosenfeld | B22F 3/1103 165/104.26 |
| 2010/0221570 | A1 * | 9/2010 | Nadler | G10K 11/16 428/613 |
| 2011/0061848 | A1 * | 3/2011 | Chiou | F28F 13/003 165/185 |

OTHER PUBLICATIONS

O. Lame, In situ Microtomography Study of Metallic Powder Sintering, Nuclear Instruments and Methods in Physics Research B, http://www.esrf.eu/UsersAndScience/Publications/Highlights/2002/Materials/MAT3, Aug. 16, 2017.

In Good Repair, Jul. 11, 2013, Aerospace Manufacturing Magazine, https://www.aero-mag.com/in-good-repair/ Mar. 16, 2017.

Pre-Sintered Preforms extend aero-engine component life. http://news.thomasnet.com, Aug. 16, 2017.

http://energy.gov/fe/how-gas-turbine-power-plants-work, How Gas Turbine Power Plants Work, Office of Fossil Energy, Nov. 8, 2017.

* cited by examiner

COOLED ARTICLE AND METHOD OF FORMING A COOLED ARTICLE

FIELD OF THE INVENTION

The present invention is directed to a cooled article and method of forming a cooled article. More specifically, the present invention is directed to an article having a porous cooling material and a method of forming an article having a porous cooling material.

BACKGROUND OF THE INVENTION

Operating temperatures of turbine systems are continuously being increased to provide increased efficiency. As the operating temperatures are increased, components of the turbine systems are modified to increase their temperature capability.

One common method of modifying the turbine system components includes the machining of cooling microchannels on or near the surface of the component. During operation a cooling medium flows through the cooling microchannels, decreasing the temperature of the component. However, the cooling effect of the cooling microchannels is limited by the size of the cooling microchannels.

Additionally, the efficiency of the cooling microchannels is dependent upon the flow of the cooling medium through the cooling microchannels. As the size of the cooling microchannels is increased, an increased amount of the cooling medium is required. However, the turbine system includes a limited amount of the cooling medium. As such, the cooling effect of the cooling microchannels is determined by the amount of airflow available in the turbine system and the effectiveness as to the use of the available cooling air.

A cooled article and method of forming a cooled article that do not suffer from one or more of the above drawbacks would be desirable in the art.

BRIEF DESCRIPTION OF THE INVENTION

In an exemplary embodiment, a cooled article includes a component, a porous material incorporated into the component, and a cooling medium flowing through the porous material.

In another exemplary embodiment, a cooled article formed by a process includes the steps of forming a porous material from a pre-sintered preform, providing a component, and incorporating the porous material into the component. The porous material is in fluid communication with a cooling medium.

In another exemplary embodiment, a method of forming a cooled article includes providing a metal felt material infused with braze filler material, pre-sintering the metal felt material to form a porous material, providing a component, and incorporating the porous material into the component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are a cooled article and method of forming a cooled article. Embodiments of the present disclosure, in comparison to processes and articles not using one or more of the features disclosed herein, increase cooling efficiency of a component, increase diffusion of a cooling medium, increase efficiency of the cooling medium, increase component life, increase turbine efficiency, increase ease of fabrication, decrease component cost, or a combination thereof.

Figure 1:
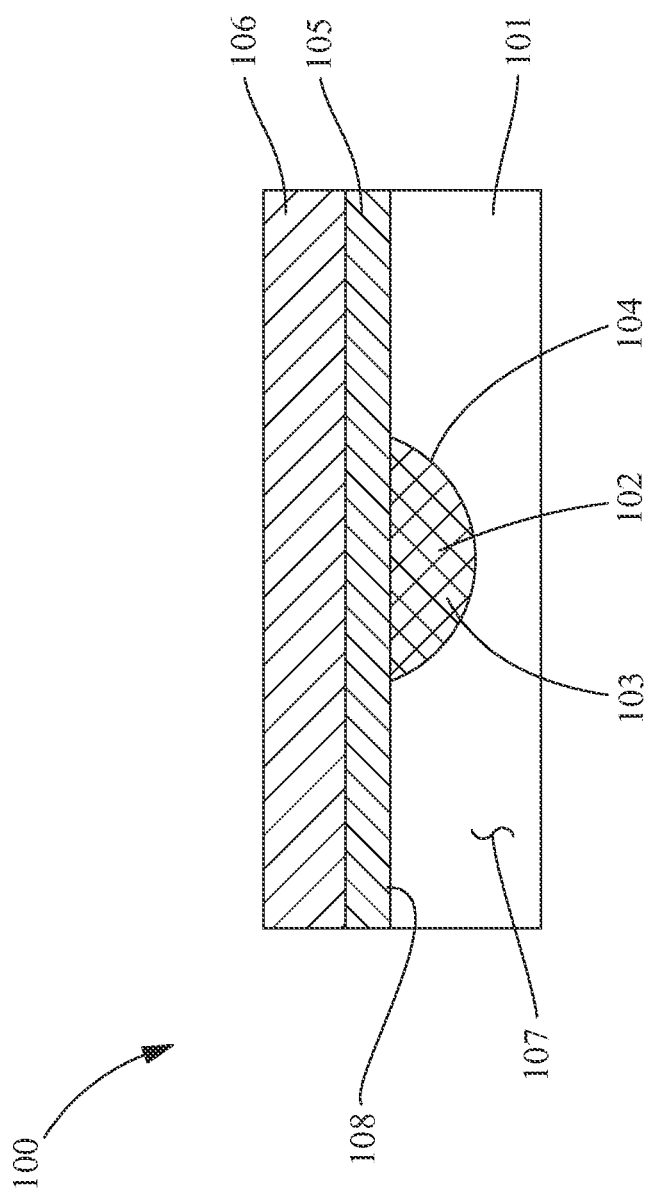
FIG. 1 is a cross-section view of a cooled article, according to an embodiment of the disclosure.

Referring to FIG. 1, in one embodiment, a cooled article 100 includes a component 101, a porous material 102 incorporated into or onto the component 101, and a cooling medium 103 flowing through the porous material 102. In another embodiment, the cooled article 100 includes a bond coat 105 and/or a thermal barrier coating 106 over the component 101. The component 101 is any suitable component capable of having near-surface cooling. Suitable components include, but are not limited to, turbine components, hot gas path components, or heat exchangers. In another embodiment, the component 101 includes any suitable material capable of withstanding operating conditions of the component 101, such as, but not limited to, aluminum, a copper alloy, a nickel alloy, a nickel based superalloy, a cobalt based superalloy, or a combination thereof.

The porous material 102 includes any suitable material capable of withstanding operating temperatures of the component 101. Suitable materials include, but are not limited to, a pre-sintered preform (PSP), a metal felt material, or a combination thereof. The cooling medium 103 flows through the porous material 102, providing a cooling effect to the component 101. A porosity of the porous material 102 forms a continuous, semi-open, mesh-like structure that diffuses the cooling medium 103 flowing therein. The diffusion of the cooling medium 103 as it flows through the mesh-like structure increases the cooling effect (e.g. heat transfer) of the cooling medium 103 as compared to the cooling medium 103 flowing through non-porous pathways, allowing for higher operating temperatures. Alternatively, the increased cooling effect provided by the porous material 102 increases an efficiency of the component 101 and permits usage of decreased amounts of the cooling medium 103. Furthermore, the porous material 102 decreases cost by reducing the number of cooling microchannels formed in the component 101.

In one embodiment, a range of the porosity of the porous material 102 includes, but is not limited to, between about 0% and about 95%, between about 5% and about 90%, between about 10% and about 90%, or any combination, sub-combination, range, or sub-range thereof. Individual pores in the porous material 102 include any suitable pore size, such as, but not limited to, between about 5 mils and about 60 mils, between about 10 mils and about 50 mils, between about 20 mils and about 40 mils, about 30 mils, or any combination, sub-combination, range, or sub-range thereof. The pores may include any suitable shape, for example, overlapping spheres, overlapping cylinders, oblong pores oriented at different angles to each other, curved pores, irregular pores, or a combination thereof.

The thickness of the porous material 102 is any suitable thickness capable of providing a flow path for the cooling medium 103. For example, in one embodiment, the thickness of the porous material 102 is matched to the thickness of a cooling microchannel 104. The thickness of the cooling microchannel 104 includes, but is not limited to, between about 0.0005 mm and about 0.02 mm, between about 0.0005 mm and about 0.01 mm, between about 0.001 mm and about 0.01 mm, or any combination, sub-combination, range, or sub-range thereof. In another embodiment, the porous material 102 is ground down after being formed. The width of porous material 102 is any width up to the surface area of the component 101. In another embodiment, the porous material 102 is formed having any suitable cross-sectional shape such as, but not limited to, circular, semi-circular, rectangular, square, triangular, oval, trapezoidal, or a combination thereof. In a further embodiment, the cross-sectional shape of the porous material 102 varies along a length of the cooling microchannel 104 and/or a length of the component 101.

The porous material 102 is positioned in any suitable position on or within the component 101. Suitable positions include, but are not limited to, within an interior portion 107 of the component 101, on an exterior surface 108 of the component 101, upstream from a portion of the component 101 to be cooled (transpirational cooling), as a portion of the component 101, within slots on the component 101, within cooling microchannels 104 on the component 101, or a combination thereof. In one embodiment, the positioning of the porous material 102 within the cooling microchannels 104 is configured to match the desired cooling performance and/or cooling pressure drop. For example, the porous material 102 positioned within the cooling microchannels 104 may extend past the exterior surface 108 of the component 101, form a continuous face with the exterior surface 108, fill only a portion of the cooling microchannels 104, or a combination thereof.

For example, in one embodiment, the porous material 102 forms a trailing edge portion of an airfoil, forms film cooling passages, is positioned within slots between a pressure side and a suction side of the trailing edge of the airfoil, or is positioned between the hot gas path component and an impingement sleeve. In another embodiment, the porous material 102 is positioned within cooling microchannels 104 on or beneath the exterior surface 108 of the component 101. Other examples include positioning the porous material 102 as an independent layer between the exterior surface 108 of the component 101 and the bond coat 105 and/or the thermal barrier coating 106, between an impingement sleeve and the interior portion 107 of the component 101 such as, but not limited to, a nozzle, or inserted into openings in component 101 to provide transpiration cooling through the porous material 102.

Figure 2:
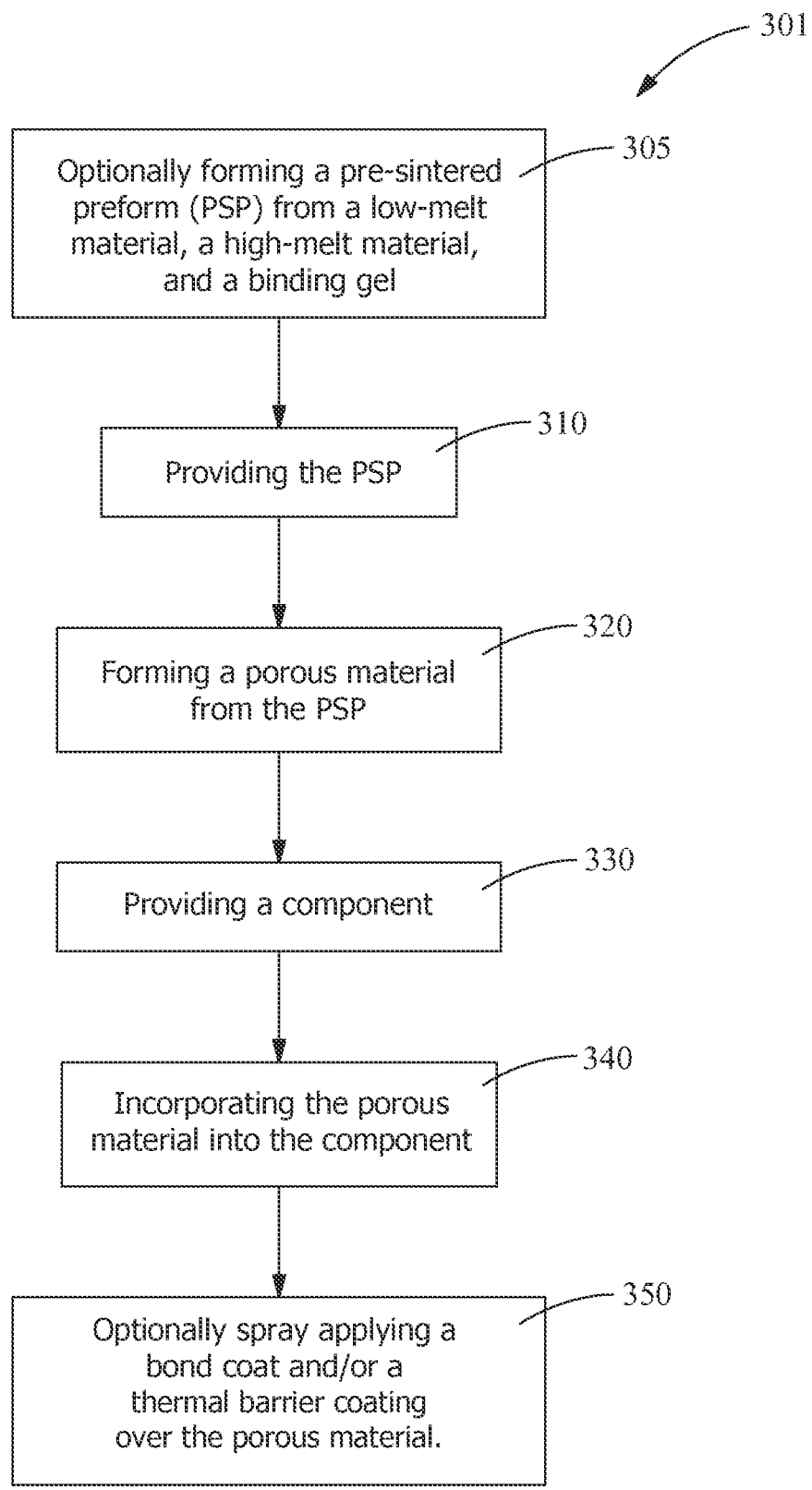
FIG. 2 is a process view of a method of forming a cooled article, according to an embodiment of the disclosure.

Referring to FIG. 2, in one embodiment, the cooled article 100 is formed by a first method 301. The first method 301 includes providing the PSP (step 310), forming the porous material 102 from the PSP (step 320), providing the component 101 (step 330), and incorporating the porous material 102 into or onto the component 101 (step 340). The incorporating of the porous material 102 into or onto the component 101 (step 340) includes any suitable securing means such as, but not limited to, brazing. The porosity in the porous material 102 is continuous after incorporation into the compound 101. The porous material 102 is in fluid communication with the cooling medium 103 after being incorporated into or onto the component 101 (step 340).

In a modification of this embodiment, the first method 301 optionally includes forming the PSP from a low-melt material, a high-melt material, and a binding agent (step 305). The low-melt material and the high-melt material are varied based upon the operating temperature of the component 101. In one embodiment, the high-melt material is a nickel-base superalloy. For example, one suitable high-melt material has a nominal composition in weight percent of about 7.6 percent chromium, about 3.1 percent cobalt, about 7.8 percent aluminum, about 5.5 percent tantalum, about 0.1 percent molybdenum, about 3.9 percent tungsten, about 1.7 percent rhenium, about 0.15 percent hathium, about 0.02 percent carbon, about 0.015 percent boron, and a balance nickel. Another suitable high-melt material has a nominal composition in weight percent of about 0.16 percent carbon, 8.2 percent chromium, 10 percent cobalt, 0.6 percent molybdenum, about 10 percent tungsten, about 3.0 percent tantalum, about 1.0 percent titanium, about 5.5 percent aluminum, about 0.015 percent boron, about 0.05 percent zirconium, about 1.5 percent hafnium, and balance nickel.

In another embodiment, the low-melt material is a nickel braze alloy. One suitable low-melt material has a nominal composition in weight percent of about 15.2 percent chromium, about 2.3 percent boron, about 10.3 percent cobalt, about 3.5 percent tantalum, about 3.5 percent aluminum, and a balance nickel. Another suitable low-melt material has a nominal composition in weight percent of about 14.0 percent chromium, about 2.75 percent boron, about 10.0 percent cobalt, about 3.5 percent aluminum, about 2.5 percent tantalum, about 0.1 percent yttrium, and balance nickel.

In one embodiment, the high-melt material maintains the porosity of the PSP as the binding agent is removed. In another embodiment, the permeability (i.e. size and torousity of the pores within the porous material 102) for any given porosity is varied to control at least heat transfer and pressure drop. In a further embodiment, the porosity and permeability are varied throughout the porous material 102. For example, to provide increased and/or decreased porosity and permeability in regions where increased and/or decreased cooling is desired, respectively.

A density of the pores in the porous material 102 is controlled by varying parameters of the formation of the porous material 102. For example, in one embodiment, the parameters of the formation of the porous material 102 from the PSP (step 320) control the density of the porous material 102. In another embodiment, the density of the porous material 102 is controlled and/or obtained by a metal foam, or metal sponge, process. The metal foam process includes providing a holder material to set the density, then burning off the holder material. The parameters of the formation of the porous material 102 are selected to provide the density corresponding with pressure and/or flow through the component 101.

In one embodiment, the porous material 102 is incorporated (step 340) into the cooling microchannel 104 on the exterior surface 108 of the component 101. In one example, the porous material 102 is pressed into the cooling microchannel 104 on the exterior surface 108 and secured anywhere along the length of the cooling microchannel 104. In another embodiment, at least a portion of the porous material 102 in the cooling microchannel 104 contains exposed holes near the exterior surface 108 of the component 101. In a further embodiment, in order to reduce or eliminate escape of the cooling medium 103 from the exposed holes in the porous material 102, the bond coat 105 and/or the thermal barrier coating 106 are spray applied (step 350) over the porous material 102.

A spray application (step 350) of the bond coat 105 and/or the thermal barrier coating 106 fills at least a portion of the exposed holes, preventing the porous material 102 from releasing the cooling medium 103 prematurely. After the spray application (step 350), the cooling medium 103 flows through the porous material 102 between the component 101 and the bond coat 105 and/or the thermal barrier coating 106. In a further embodiment, the cooling medium 103 flows through the porous material 102 unimpeded by the bond coat 105 and/or the thermal barrier coating 106 that filled the exposed holes.

In one embodiment, the bond coat 105 and/or the thermal barrier coating 106 are not spray applied (step 350), or are only partially spray applied (step 350) over the porous material 102, leaving exposed holes in the porous material 102 near the exterior surface 108. The exposed holes permit the cooling medium 103 to escape from the component 101 to perform surface cooling. In another embodiment, the escaping cooling medium 103 removes heat from within the component 101, cooling the interior portion 107 of the component 101. In yet another embodiment, the escaping cooling medium 103 flows over a downstream portion of the component 101, providing film cooling of the exterior surface 108 of the downstream portion of the component 101. In a further embodiment, sections of the porous material 102 extend from the interior portion 107 of the component 101 to the external surface 108, permitting cooling fluid to pass uniformly through the porous material 102 and provide transpiration cooling directly from the interior portion 107.

The bond coat 105 includes any suitable material, for example, MCrAlX. The MCrAlX is an alloy having M selected from one or a combination of iron, nickel, cobalt, and combinations thereof; Cr is chromium, Al is aluminum, and X is an element selected from the group of solid solution strengtheners and gamma prime formers consisting of Y, Tc, Ta, Re, Mo, Si, and W and grain boundary strengtheners consisting of B, C, Hf, Zr, and combinations thereof.

The spray application (step 350) of the bond coat 105 and/or the thermal barrier coating 106 forms a coating having any suitable thickness. Suitable thicknesses of the bond coat 105 and/or the thermal barrier coating 106 include, but are not limited to, up to about 1 mm, up to about 0.8 mm, between about 0.1 mm and about 0.8 mm, or any combination, sub-combination, range, or sub-range thereof. In one embodiment, an entrance and an exit of the cooling microchannel 104 are masked prior to the spray application (step 350) of the bond coat 105 and/or the thermal barrier coating 106. The masking prevents the blocking of a masked portion of the holes in the porous material 102 during the spray application (step 350) of the bond coat 105 and/or the thermal barrier coating 106.

In one embodiment, the porous material 102 is incorporated (step 340) into the cooling microchannel 104 beneath the exterior surface 108 of the component 101. Examples of cooling microchannels 104 beneath the exterior surface 108 of the component 101 include, but are not limited to, near-surface microchannels, internal microchannels, or a combination thereof. In another embodiment, incorporating (step 340) the porous material 102 into the cooling microchannel 104 includes inserting the porous material 102 into an entrance and/or an exit of the cooling microchannel 104, then securing the porous material 102 by any suitable securing means.

Figure 3:
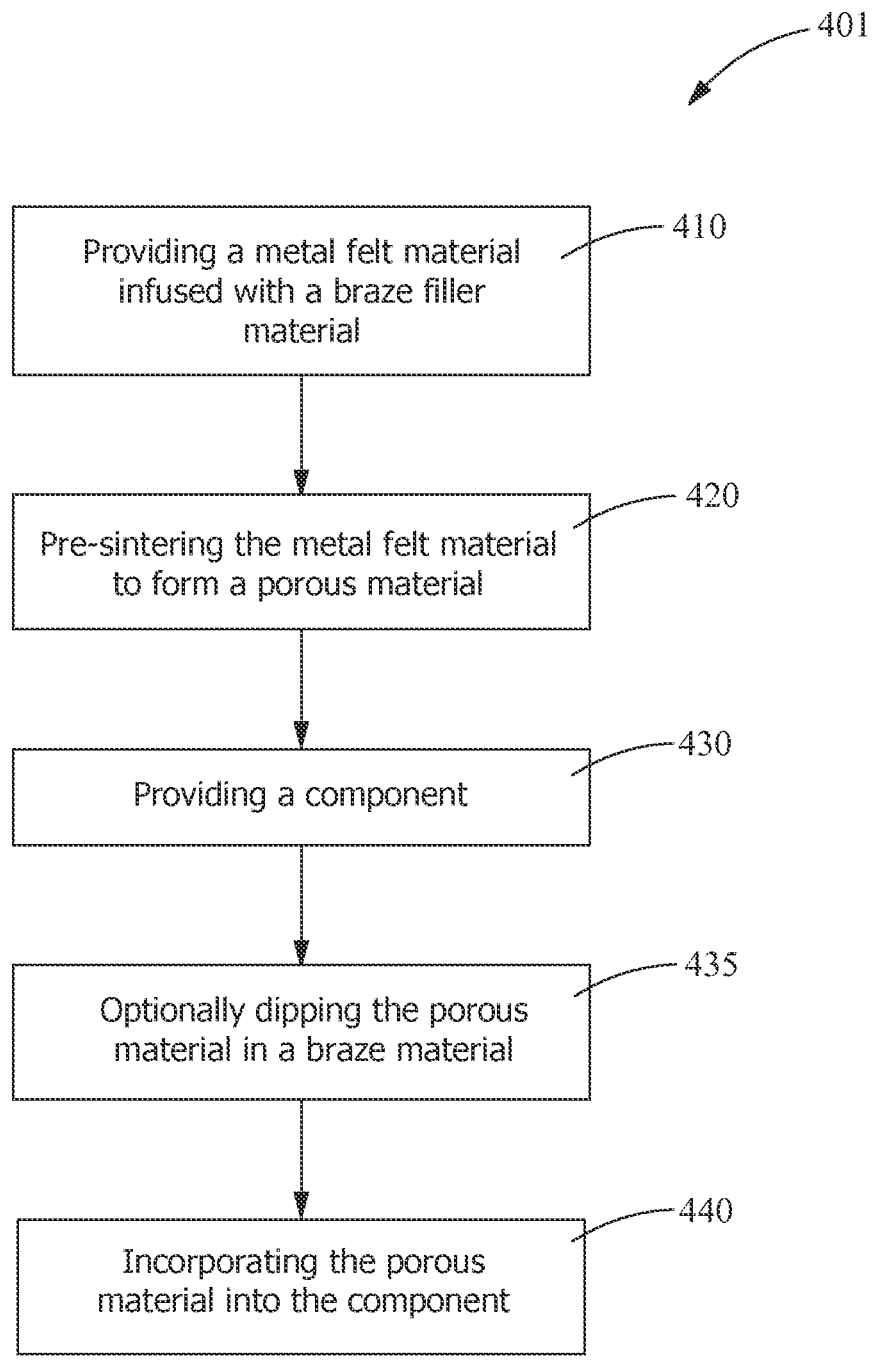
FIG. 3 is a process view of a method of forming a cooled article, according to an embodiment of the disclosure.

Referring to FIG. 3, in one embodiment, the cooled article 100 having included porous material 102 is formed through a second method 401. The second method 401 includes providing a metal felt material infused with a braze filler material (step 410), pre-sintering the metal felt material to form the porous material 102 (step 420), providing the component 101 (step 430), and incorporating the porous material 102 into or onto the component 101 (step 440) such as by brazing.

In one embodiment, the porous material 102 or PSP is dipped in a braze material (step 435) then incorporated into or onto the component (step 440). In another embodiment, the dipping of the porous material 102 in the braze material (step 435) includes submerging the braze material, coating the entire porous material 102. Alternatively, the porous material 102 may be partially dipped (step 435) in the braze material, leaving at least a portion of the porous material 102 uncoated. Suitable braze materials for dipping may include nickel based braze materials. For example, one suitable braze material has a nominal composition in weight percent of about 14.0 percent chromium, about 2.75 percent boron, about 10.0 percent cobalt, about 3.5 percent aluminum, about 2.5 percent tantalum, about 0.1 percent yttrium, and balance nickel. Another suitable braze material has a nominal composition in weight percent of about 19 percent chromium, about 0.03 percent boron, about 10 percent silicon, about 0.1 percent carbon, and balance nickel. Yet another suitable braze material has a nominal composition in weight percent of about 15 percent chromium, about 3.6 percent boron, about 1.5 percent iron, about 0.06 percent carbon, and balance nickel.

The braze material includes any suitable material capable of securing the porous material 102 to the component 101. For example, in one embodiment, the braze material is a high-melt nickel-based superalloy. Positioning the braze material between the porous material 102 and the component 101 facilitates attachment of the porous material 102 to the component 101.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cooled article, comprising:
   a component, having at least one microchannel;
   a porous material including a pre-sintered preform material positioned within the at least one microchannel; and
   a cooling medium flowing through the porous material;
   wherein the pre-sintered preform material comprises a high melt powder material and a low melt powder material, and
   wherein the porous material is directly attached to the component by the low melt material.

2. The cooled article of claim 1, wherein the porous material comprises a porosity of between about 5 percent and about 90 percent.

3. The cooled article of claim 1, wherein a pore size of individual pores in the porous material comprises between about 5 mils and about 60 mils.

4. The cooled article of claim 1, wherein the porous material diffuses the cooling medium.

5. The cooled article of claim 4, wherein diffusing the cooling medium increases an efficiency of the cooled article.

6. The cooled article of claim 1, wherein the porous material is incorporated within an interior portion of the component.

7. The cooled article of claim 1, wherein the porous material is incorporated within a cooling microchannel.

8. The cooled article of claim 1, wherein the porous material is incorporated onto an exterior portion of the component.

9. The cooled article of claim 8, wherein the porous material is coated by a bond coat.

10. The cooled article of claim 8, wherein the porous material is coated by a thermal barrier coating.

11. The cooled article of claim 1, wherein the component is selected from the group consisting of a turbine component, a hot gas path component, and a heat exchanger.

12. The cooled article of claim 1, wherein the component comprises at least one material selected from the group consisting of nickel based superalloys and cobalt based superalloys.

13. A cooled article comprising:
   a porous material formed from a pre-sintered preform, the porous material comprising a pre-sintered preform material;
   a component having at least one microchannel formed therein; and
   the porous material positioned into at least one of the at least one microchannel of the component;
   wherein the pre-sintered preform material comprises a high melt powder material and a low melt powder material, and
   wherein the porous material is in fluid communication with a cooling medium and the porous material is directly attached to the at least one microchannel by the low melt material.

14. The cooled article of claim 13, wherein the pre-sintered preform material includes a high-melt material comprising a nickel-based superalloy.

15. The cooled article of claim 13, wherein the high-melt material defines the porosity of the pre-sintered preform.

16. The cooled article of claim 13, wherein the porous material is attached to the at least one microchannel by a braze joint formed of the low melt material.

17. The cooled article of claim 13, comprising a bond coat over the porous material.

18. The cooled article of claim 1, wherein the porous material is attached to the component by a braze joint formed of the low melt material.

* * * * *